United States Patent
Bagehorn et al.

(10) Patent No.: US 10,055,455 B2
(45) Date of Patent: *Aug. 21, 2018

(54) USER DRIVEN BUSINESS DATA AGGREGATION AND CROSS MAPPING FRAMEWORK

(71) Applicant: INTERNATIONAL BUSINESS MACHINES CORPORATION, Armonk, NY (US)

(72) Inventors: Frank Bagehorn, Dottikon (CH); Daniel N. Bauer, Birmensdorf (CH); Thomas A. Jobson, Jr., New Paltz, NY (US); Adeel Qureshi, Islamabad (PK)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/615,116

(22) Filed: Jun. 6, 2017

(65) Prior Publication Data
US 2017/0277748 A1 Sep. 28, 2017

Related U.S. Application Data

(63) Continuation of application No. 14/523,244, filed on Oct. 24, 2014, now Pat. No. 9,720,958.

(51) Int. Cl.
*G06F 17/30* (2006.01)
(52) U.S. Cl.
CPC .. *G06F 17/30412* (2013.01); *G06F 17/30312* (2013.01); *G06F 17/30315* (2013.01)

(58) Field of Classification Search
CPC ......... G06F 17/30412; G06F 17/30312; G06F 17/30315
(Continued)

(56) References Cited

U.S. PATENT DOCUMENTS 8,577,833 B2 11/2013 Erla et al.
8,589,338 B2 11/2013 Maes
(Continued)

OTHER PUBLICATIONS

Zeng et al., Query Performance Tuning in Supply Chain Analytics, 2011, IEEE, 327-331.*
(Continued)

*Primary Examiner* — Jean B Fleurantin
(74) *Attorney, Agent, or Firm* — Schmeiser, Olsen & Watts; John R. Pivnichny

(57) ABSTRACT

An approach is provided for aggregating business data. Based on received columns, attributes, and keys of a dataset, the dataset is registered in a central hub of datasets which include data that is independently and locally maintained. Other datasets in the central hub that include columns, attributes, or keys that match the received columns, attributes, or keys, respectively, are determined and displayed. Responsive to receiving a user selection of one or more of the displayed datasets, cross-links between the dataset and each of the one or more selected datasets are generated. Based on a modification of a selected one of the cross-links and a second user interacting with the central hub, the modification and other cross-link(s) are displayed. Based on the second user's selection of the modification or one of the other cross-link(s), an analysis of data in the dataset is performed.

16 Claims, 9 Drawing Sheets

(58) Field of Classification Search
USPC .................................................. 707/801–806
See application file for complete search history.

(56) References Cited

U.S. PATENT DOCUMENTS

| | | | |
|---|---|---|---|
| 9,720,958 B2 * | 8/2017 | Bagehorn et al. ............ | 707/805 |
| 2006/0161559 A1 * | 7/2006 | Bordawekar et al. ........ | 707/100 |
| 2011/0320971 A1 | 12/2011 | Seeger et al. | |
| 2012/0011167 A1 * | 1/2012 | Schmidt ...................... | 707/100 |
| 2016/0117362 A1 | 4/2016 | Bagehorn et al. | |

OTHER PUBLICATIONS

Aluir, et al.; Patterns: Information Aggregation and Data Integration with DB2 Information Integrator; IBM Redbooks; Sep. 2004; 340 pages.
IBM; A generic framework for value aggregation in Business Performance Management systems; IP.com; IP.com No. IPCOM000126704D; Jul. 29, 2005; 9 pages.
Zeng, Xiaoqing et al.; Query Performance Tuning in Supply Chain Analytics; Fourth International Joint Conference on Computational Sciences and Optimization; Jul. 18, 2011; pp. 327-331.
Syta, James M.; List of IBM Patents or Patent Applications Treated as Related; May 26, 2017; 1 page.

* cited by examiner

Override rules for Record Mapping

Domain 2 Attributes

| Override? | Attribute | Value | Override to |
|---|---|---|---|
| ☐ | Dom2 ID | 22002200 | |
| ☑ | Sector | Financial | Public |
| ☐ | Status | Active | |
| ☐ | Country | ABC | |

⎬ 602

Domain 4 Attributes

| Override? | Attribute | Value | Override to |
|---|---|---|---|
| ☐ | Dom4 ID | xyz | |
| ☑ | Sector | Financial | Public |
| ☐ | ... | ... | |
| ☐ | ... | ... | |

⎬ 604

...

[ Save ] ← 606

USER DRIVEN BUSINESS DATA AGGREGATION AND CROSS MAPPING FRAMEWORK

This application is a continuation application claiming priority to Ser. No. 14/523,244 filed Oct. 24, 2014, now U.S. Pat. No. 9,720,958, issued Aug. 1, 2017.

TECHNICAL FIELD

The present invention relates to data aggregation, and more particularly to integrating business data into a central hub of data domains.

BACKGROUND

Within an operations environment of a business, there are typically multiple domains of information that become critical to the day-to-day operations and future planning for the business. These data domains may include, for example, clients, accounts, opportunities, contracts, delivery centers, work pools, workgroups, etc., and often begin by not having an association to new data domains. These data domains are sometimes invented or registered as stop-gap approaches, as alternatives to using common reference data. Some data domains are housed in data marts that link them together, while many other data domains end up being managed independently, stored independently, and un-correlated, which creates business transparency issues that may result in a lack of exposure in reporting, analytics, planning, etc. Locally maintained data control lists become increasingly integrated with local business processes, information technology (IT) systems, and data marts, but the lists never become integrated with a globally focused hub of data domains so that transparency exists across common reference keys between enterprise data sources and local data sources. The end result is that geography, country, and department teams invest in local resources that manage these local data control lists and cross-enterprise analytics are constrained because of integration with various data domains that were never built or designed with cross linkage in mind.

Furthermore, there are times when a business must maintain a pre-final version and/or a final-alternative version of a data record set to support the business. These data record sets may be used in reporting, cross-mapping, and analytics, which goes beyond a use of one master reference set of data records for a data domain. For example, these data records might be used in the following scenarios: (1) a sales planning team needs to construct a pre-final sales focus client list that is different from a present base dataset; (2) a final-alternative version of an account list exists that has geo-customized attributes due to local data standard variants needed to support geo/local business operations data; and (3) an organization processes data under a specific point of view, which results in cross-maps that use only a subset of master reference maps. The known approach to the aforementioned scenarios is for local business staff and/or IT support teams to create local extracts of trusted data sources and manage and share the adapted lists by a person-to-person email exchange with no ability for collaborating business users to access the alternative lists centrally on-demand and/or cross map the data in these alternatives.

BRIEF SUMMARY

In a first embodiment, the present invention provides a method of aggregating business data. The method includes a computer receiving, from a user, columns, attributes of the columns, and keys of a dataset of a database. The keys are unique identifiers of records in the dataset. The dataset is not initially cross-linked to any dataset included in a central hub of a plurality of datasets. Each dataset in the central hub includes data that is independently and locally maintained. The method further includes, based on the received columns, attributes, and keys of the dataset, the computer registering the dataset so that the dataset is included in the central hub. The method further includes the computer loading initial data or updated data into the dataset in the central hub. The method further includes the computer determining and displaying other datasets included in the central hub that include columns, attributes, or keys that match the received columns, attributes, or keys, respectively. The method further includes the computer receiving from the user a selection of one or more of the displayed datasets. The method further includes, in response to the step of receiving the selection, the computer automatically generating cross-links between the dataset and each of the one or more datasets selected from the displayed datasets. The cross-links are based at least in part on the columns, attributes, or keys of the displayed datasets that match the received columns, attributes or keys. The cross-links provide an aggregation of business data in the dataset and the one or more datasets.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of aggregating business data. The method includes the computer system receiving, from a user, columns, attributes of the columns, and keys of a dataset of a database. The keys are unique identifiers of records in the dataset. The dataset is not initially cross-linked to any dataset included in a central hub of a plurality of datasets. Each dataset in the central hub includes data that is independently and locally maintained. The method further includes, based on the received columns, attributes, and keys of the dataset, the computer system registering the dataset so that the dataset is included in the central hub. The method further includes the computer system loading initial data or updated data into the dataset in the central hub. The method further includes the computer system determining and displaying other datasets included in the central hub that include columns, attributes, or keys that match the received columns, attributes, or keys, respectively. The method further includes the computer system receiving from the user a selection of one or more of the displayed datasets. The method further includes, in response to the step of receiving the selection, the computer system automatically generating cross-links between the dataset and each of the one or more datasets selected from the displayed datasets. The cross-links are based at least in part on the columns, attributes, or keys of the displayed datasets that match the received columns, attributes or keys. The cross-links provide an aggregation of business data in the dataset and the one or more datasets.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of aggregating business data. The method includes the computer system receiving, from a user, columns, attributes of the columns, and keys of a dataset of a database. The keys are unique identifiers of records in the dataset. The dataset is not initially cross-linked to any dataset included in a central hub of a plurality of datasets. Each dataset in the central hub includes data that is independently and locally maintained. The method further includes, based on the received columns, attributes, and keys of the dataset, the computer system registering the dataset so that the dataset is included in the central hub. The method further includes the computer system loading initial data or updated data into the dataset in the central hub. The method further includes the computer system determining and displaying other datasets included in the central hub that include columns, attributes, or keys that match the received columns, attributes, or keys, respectively. The method further includes the computer system receiving from the user a selection of one or more of the displayed datasets. The method further includes, in response to the step of receiving the selection, the computer system automatically generating cross-links between the dataset and each of the one or more datasets selected from the displayed datasets. The cross-links are based at least in part on the columns, attributes, or keys of the displayed datasets that match the received columns, attributes or keys. The cross-links provide an aggregation of business data in the dataset and the one or more datasets.

Embodiments of the present invention allow independently and locally maintained data domains within an enterprise to be integrated into an aggregating central hub so that previously silo-centric data control lists are cross-linked and shareable to a maximum population of users in the enterprise. Furthermore, the central hub allows users to modify pre-configured trusted datasets and cross-maps to create new user-defined versions of the datasets and make the versions available to other users in the enterprise, thereby providing an alternative or a supplement to the pre-configured trusted datasets.

BRIEF DESCRIPTION OF THE DRAWINGS

FIG. 6 depicts an example of overriding values of attributes in the process of FIG. 3, in accordance with embodiments of the present invention.

DETAILED DESCRIPTION

Overview

Embodiments of the present invention allow users in an enterprise to register their independently and locally maintained lists of control records of a data domain and register the records to extend a central aggregating hub of data domains which may include other independently and locally maintained data domains. By registering the records in the central hub, previously silo-centric data control lists that had never been integrated become federated, cross-link integrated, and sharable to a maximum population of users and/or employees of the enterprise. Data control lists are published to the central hub, which provides horizontal data transparency to facilitate business opportunity and result insights and expose data quality insights across the different data domains registered in the hub. As used herein, a data domain includes one or more datasets.

Embodiments of the present invention allow users to utilize trusted reference data from many data sources with the data pre-cross mapped, both directly and through transient cross mapping rules. End users can modify a pre-configured dataset and/or a pre-configured cross map to create a new user-defined version of the dataset. The new version can be made public and can be used as an alternative or as a supplement to the pre-configured dataset.

System for Aggregating Business Data

Figure 1:
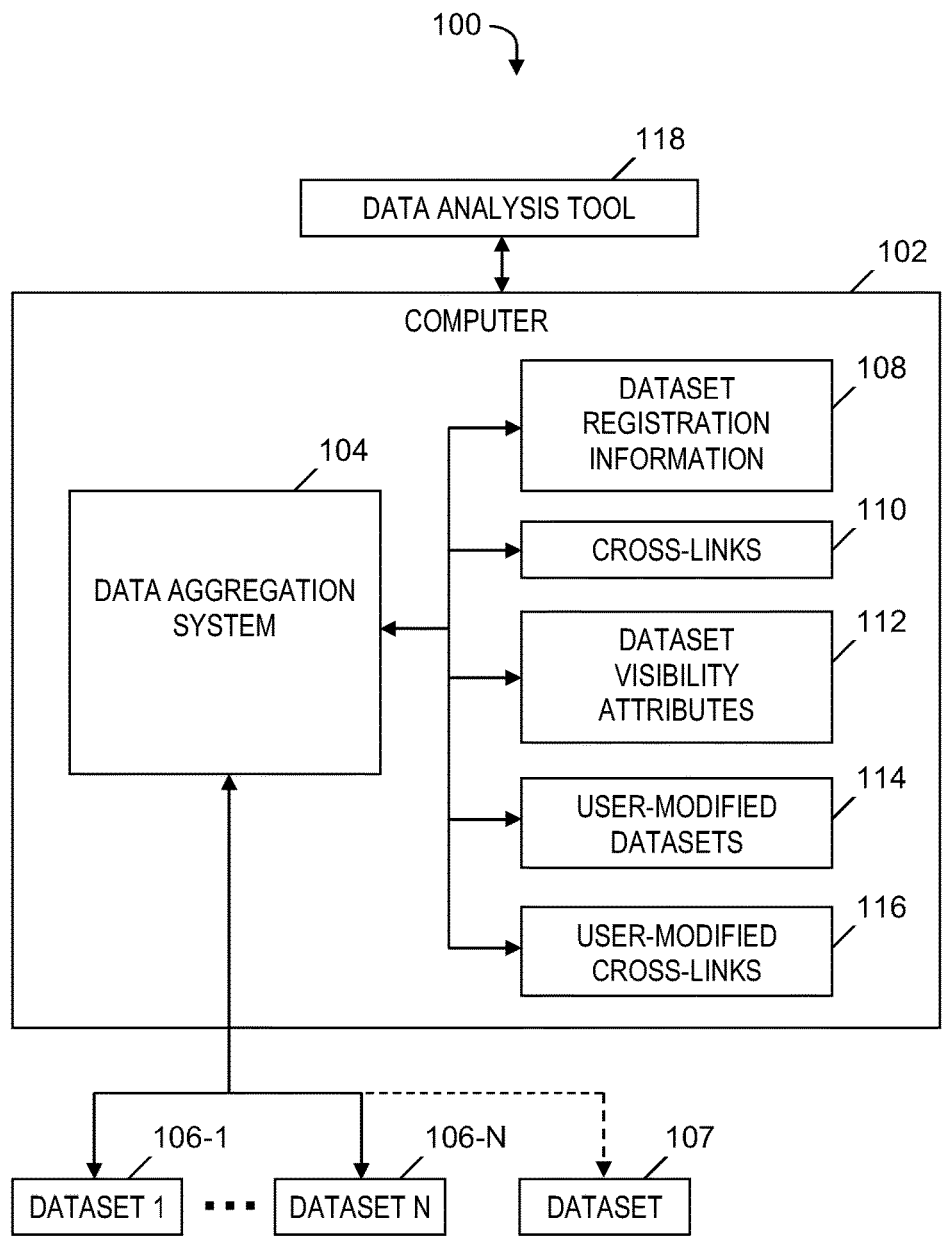
FIG. 1 is a block diagram of a system for aggregating business data, in accordance with embodiments of the present invention.

FIG. 1 is a block diagram of a system 100 for aggregating business data, in accordance with embodiments of the present invention. System 100 includes a computer 102, which executes a software based data aggregation system 104, which creates and maintains a central hub of datasets which includes an aggregation of dataset 106-1, . . . , 106-N (i.e., dataset 1, . . . , dataset N), where N is an integer greater than 1. As indicated by the dashed lines in FIG. 1, a dataset 107 is being added to the central hub. Data aggregation system 104 accesses one or more data stores (not shown) that include dataset registration information 108, cross-links 110, dataset visibility attributes 112, user-modified datasets 114, and user-modified cross-links 116.

Dataset registration information 108 includes columns, column attributes, and keys of respective datasets received by data aggregation system 104 and registered to be included in the central hub of datasets. Cross-links 110 includes mappings that link respective datasets in the central hub to one or more other datasets in the central hub. Dataset visibility attributes 112 includes indicators of whether each dataset in the central hub is public (i.e., the data in the dataset is visible to all users of the central hub) or private (i.e., the data in the dataset is visible only to users who are authorized to access the data). If a dataset is private, dataset visibility attributes 112 includes identifiers of the users who are authorized to view the data.

Data aggregation system 104 receives a user selection(s) of dataset(s) in the central hub and user modification(s) of record(s) included in the selected dataset(s). Each user modification is a deletion of a record, an amendment of a record, or a record added to existing records in one of the selected dataset. Data aggregation system 104 makes the received user-modifications to the selected dataset(s) to generate alternate version(s) of the selected dataset(s). Data aggregation system 104 stores the alternate version(s) in user-modified datasets 114 and adds the alternate version(s) to the central hub.

Data aggregation system 104 receives user selection(s) of dataset(s) in the central hub and user modification(s) of cross-link(s) between the selected dataset(s) and one or more of the datasets included in the central hub. Data aggregation system 104 generates alternate version(s) of the selected dataset(s) based on the modified cross-link(s), stores the modified cross-link(s) in user-modified cross-links 116.

Although not shown in FIG. 1, a software-based data analysis tool is executed by computer 102 or by another computer (not shown) and receives data from data aggregation system 104. The data analysis tool analyzes data included in datasets that are included in the central hub and that are cross-linked based on cross-links 110 and user-modified cross-links 116.

The functionality of the components of FIG. 1 is described in more detail in the discussion presented below relative to FIG. 2, FIG. 3 and FIG. 7.

Process for Aggregating Business Data

Figure 2:
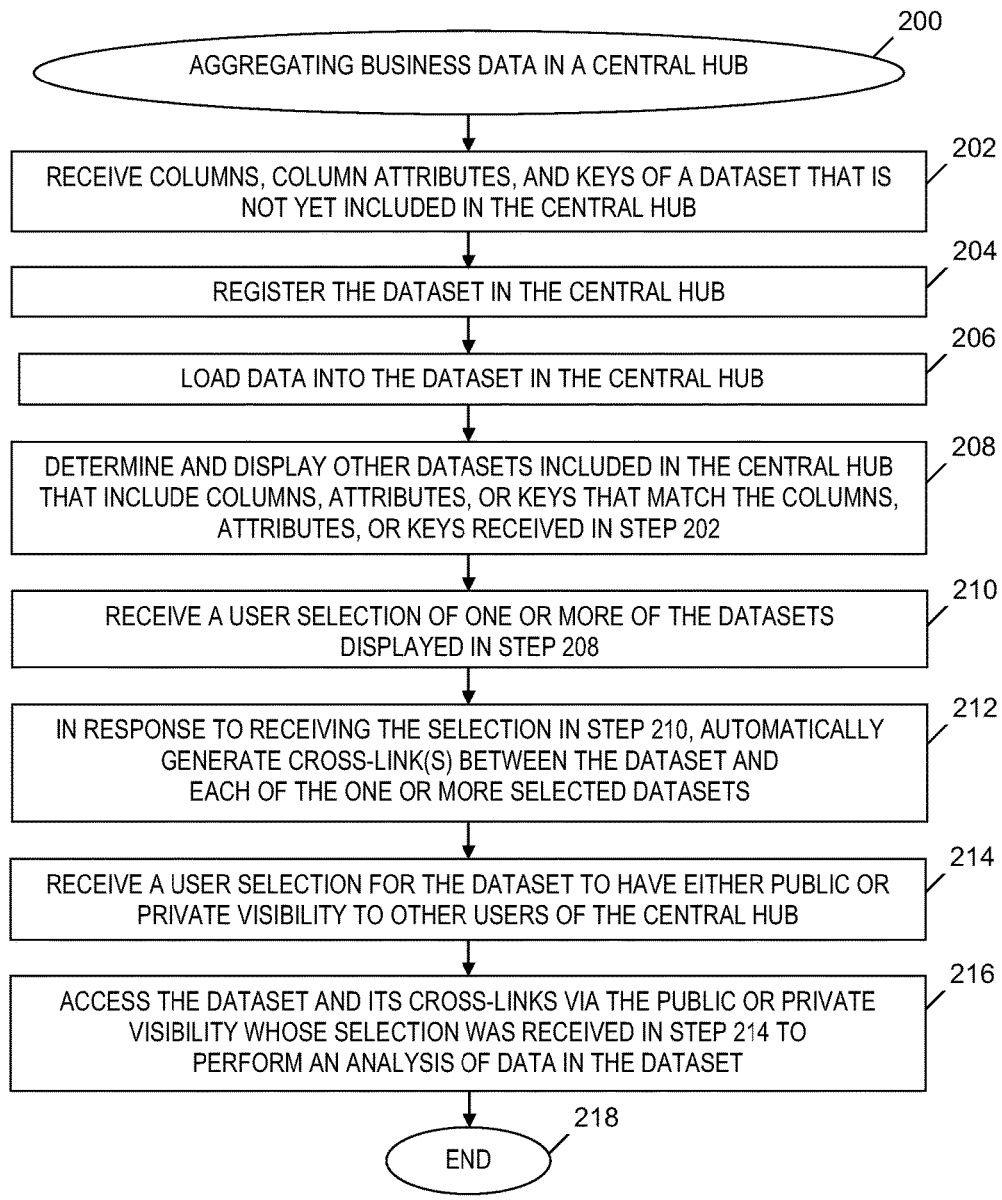
FIG. 2 is a flowchart of a process of aggregating business data, where the process is implemented in the system of FIG. 1, in accordance with embodiments of the present invention.

FIG. 2 is a flowchart of a process of aggregating business data, where the process is implemented in the system of FIG. 1, in accordance with embodiments of the present invention. The process of FIG. 2 starts at step 200. In step 202, data aggregation system 104 (see FIG. 1) receives columns, column attributes, and keys of dataset 107 (see FIG. 1), which is not yet included in the central hub maintained by data aggregation system 104 (see FIG. 1). After step 202 and prior to step 204, data aggregation system 104 (see FIG. 1) stores the received columns, column attributes and keys in dataset registration information 108 (see FIG. 1).

In step 204, data aggregation system 104 (see FIG. 1) registers dataset 107 (see FIG. 1) in the central hub maintained by data aggregation system 104 (see FIG. 1), which results in dataset 107 (see FIG. 1) being is included in the central hub.

In step 206, data aggregation system 104 (see FIG. 1) loads data into dataset 107 (see FIG. 1) to populate dataset 107 (see FIG. 1) in the central hub.

In step 208, data aggregation system 104 (see FIG. 1) determines and subsequently displays in a user interface other datasets included in the central hub that include columns, column attributes, or keys that match the columns, column attributes, or keys received in step 202. Data aggregation system provides the aforementioned user interface.

In step 210, data aggregation system 104 (see FIG. 1) receives a selection by a user via the user interface of one or more of the datasets displayed in step 208 to indicate the dataset(s) the user wants to cross-link to dataset 107 (see FIG. 1).

In step 212, in response to receiving the user selection in step 210, data aggregation system 104 (see FIG. 1) automatically generates cross-link(s) between dataset 107 (see FIG. 1) and the dataset(s), respectively, whose selection by the user was received in step 210.

In step 214, data aggregation system 104 (see FIG. 1) receives from the user or another user, a selection of either public or private visibility for dataset 107 (see FIG. 1). The selected public or private visibility applies to users of the central hub maintained by data aggregation system 104 (see FIG. 1).

In step 216, in response to a request from a data analysis tool, data aggregation system 104 (see FIG. 1) accesses dataset 107 (see FIG. 1) and data in the dataset(s) to which cross-link(s) were generated in step 212. The access to dataset 107 (see FIG. 1) is performed via the public or private visibility selected in step 214. The data analysis tool utilizes the accessed data in the cross-linked dataset(s) to perform an analysis of data in dataset 107 (see FIG. 1).

The process of FIG. 2 ends at step 218.

Figure 3:
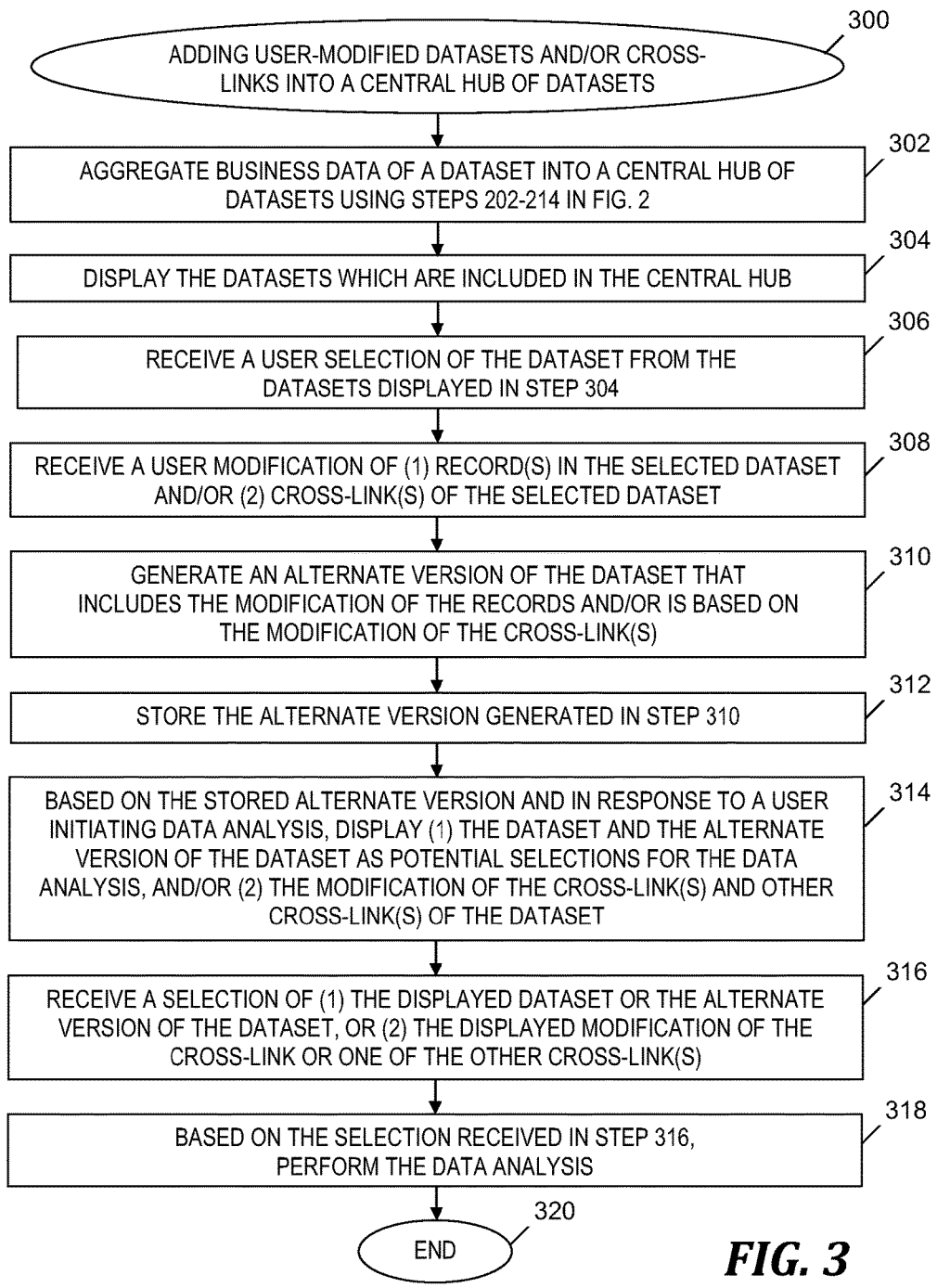
FIG. 3 is a flowchart of a process of adding user-modified datasets and/or user-modified cross-links into a central hub, where the process is implemented in the system of FIG. 1, in accordance with embodiments of the present invention.

FIG. 3 is a flowchart of a process of adding user-modified datasets and/or user-modified cross-links into a central hub, where the process is implemented in the system of FIG. 1, in accordance with embodiments of the present invention. The process of FIG. 3 starts at step 300. In step 302, using step 202 through and including step 214 in FIG. 2, data aggregation system 104 (see FIG. 1) aggregates business data of dataset 107 (see FIG. 1) into the central hub of datasets 106-1, . . . 106-N (see FIG. 1).

In step 304, data aggregation system 104 (see FIG. 1) displays the datasets 106-1, . . . 106-N (see FIG. 1) and dataset 107 (see FIG. 1), which are the datasets included in the central hub.

In step 306, data aggregation system 104 (see FIG. 1) receives from a user a selection of dataset 107 (see FIG. 1) from the datasets displayed in step 304.

In step 308, data aggregation system 104 (see FIG. 1) receives from a user a modification of the records in dataset 107 (see FIG. 1) or a modification of one of the cross-links from dataset 107 (see FIG. 1) to one of the other datasets in the central hub.

In step 310, data aggregation system 104 (see FIG. 1) generates either (1) an alternate version of dataset 107 (see FIG. 1), where the alternate version includes the modification of the records received in step 308, or (2) an alternate version of the cross-links from dataset 107 (see FIG. 1), where the alternate version includes the modification of the cross-link received in step 308.

In step 312, data aggregation system 104 (see FIG. 1) stores the alternate version generated in step 310 into (1) user-modified datasets 114 (see FIG. 1) if the alternate version of dataset 107 (see FIG. 1) was generated in step 310, or (2) user-modified cross-links 116 (see FIG. 1) if the alternate version of the cross-links from dataset 107 (see FIG. 1) was generated in step 310.

In step 314, based on the stored alternate version and in response to a user interacting with a data analysis tool to initiate data analysis, data aggregation system 104 (see FIG. 1) displays (1) dataset 107 (see FIG. 1) and the alternate version of dataset 107 (see FIG. 1) if the alternate version of dataset 107 (see FIG. 1) was generated in step 310, or (2) the modification of the cross-link and other cross-link(s) from dataset 107 (see FIG. 1) if the alternate version of the cross-links from dataset 107 (see FIG. 1) was generated in step 310. In another embodiment, step 314 is performed in response to a user interacting with data aggregation system 104 (see FIG. 1) to initiate the data analysis.

In step 316, data aggregation system 104 (see FIG. 1) receives a selection of (1) the displayed dataset 107 (see FIG. 1) or the alternate version of dataset 107 (see FIG. 1), or (2) the displayed modification of the cross-link or one of the other, unmodified, cross-link(s).

In step 318, the data analysis tool (or data aggregation system 104 (see FIG. 1)) performs the data analysis on data in (1) dataset 107 (see FIG. 1) if a selection of the displayed dataset 107 (see FIG. 1) was received in step 316, (2) the alternate version of dataset 107 (see FIG. 1) if a selection of the alternate version of dataset 107 (see FIG. 1) was received in step 316, (3) dataset 107 (see FIG. 1) and in a dataset cross-linked to dataset 107 (see FIG. 1) by the modification of the cross-link if a selection of the modification of the cross-link was received in step 316, or (4) dataset 107 (see FIG. 1) and in a dataset cross-linked to dataset 107 (see FIG. 1) by one of the unmodified cross-link(s) if a selection of the unmodified cross-link was received in step 316. The process of FIG. 3 ends at step 320.

Examples

Figure 4A:
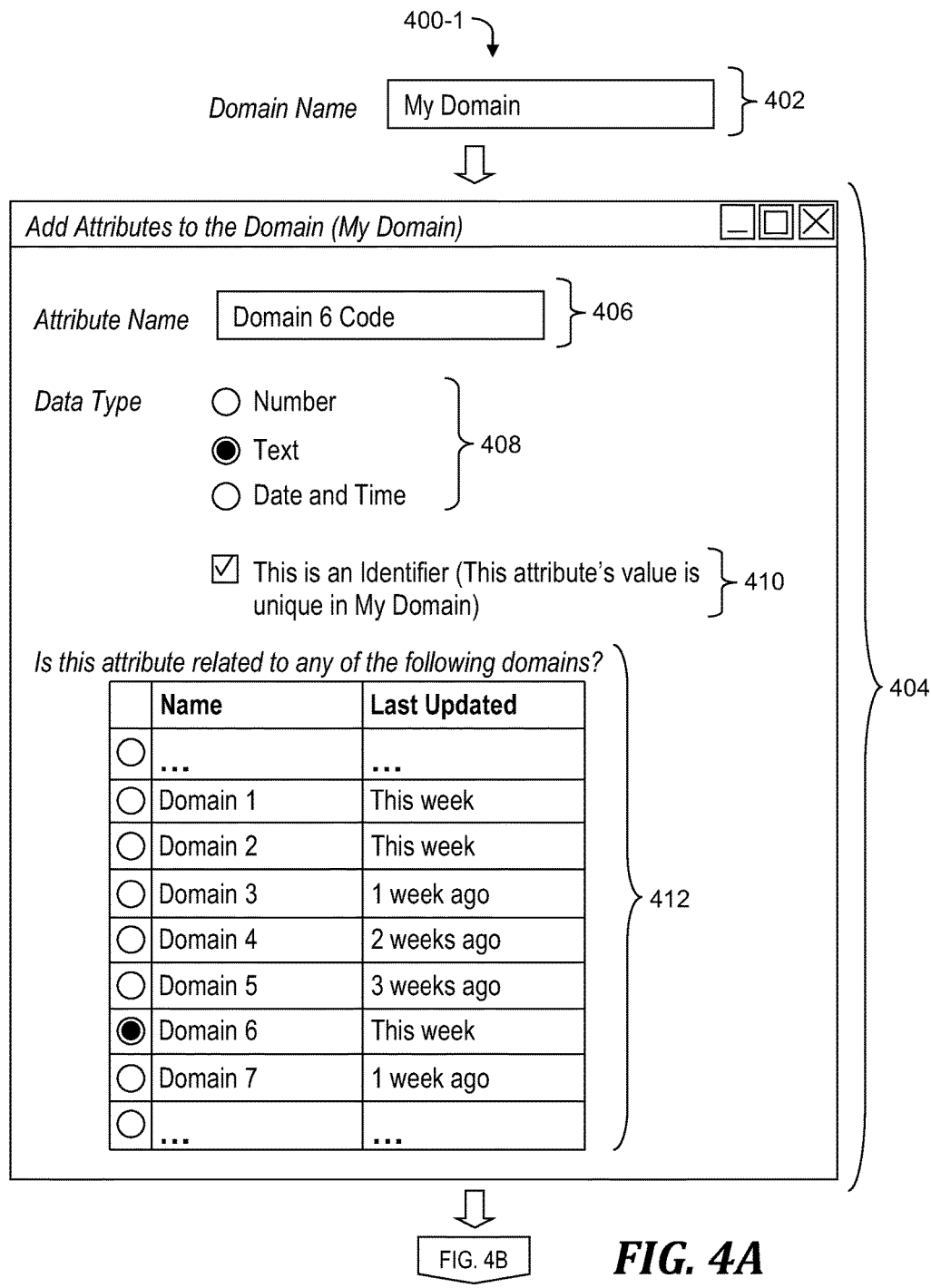
FIGS. 4A-4B depict an example of registering a data domain in a central hub in the process of FIG. 2, in accordance with embodiments of the present invention.
Figure 4B:
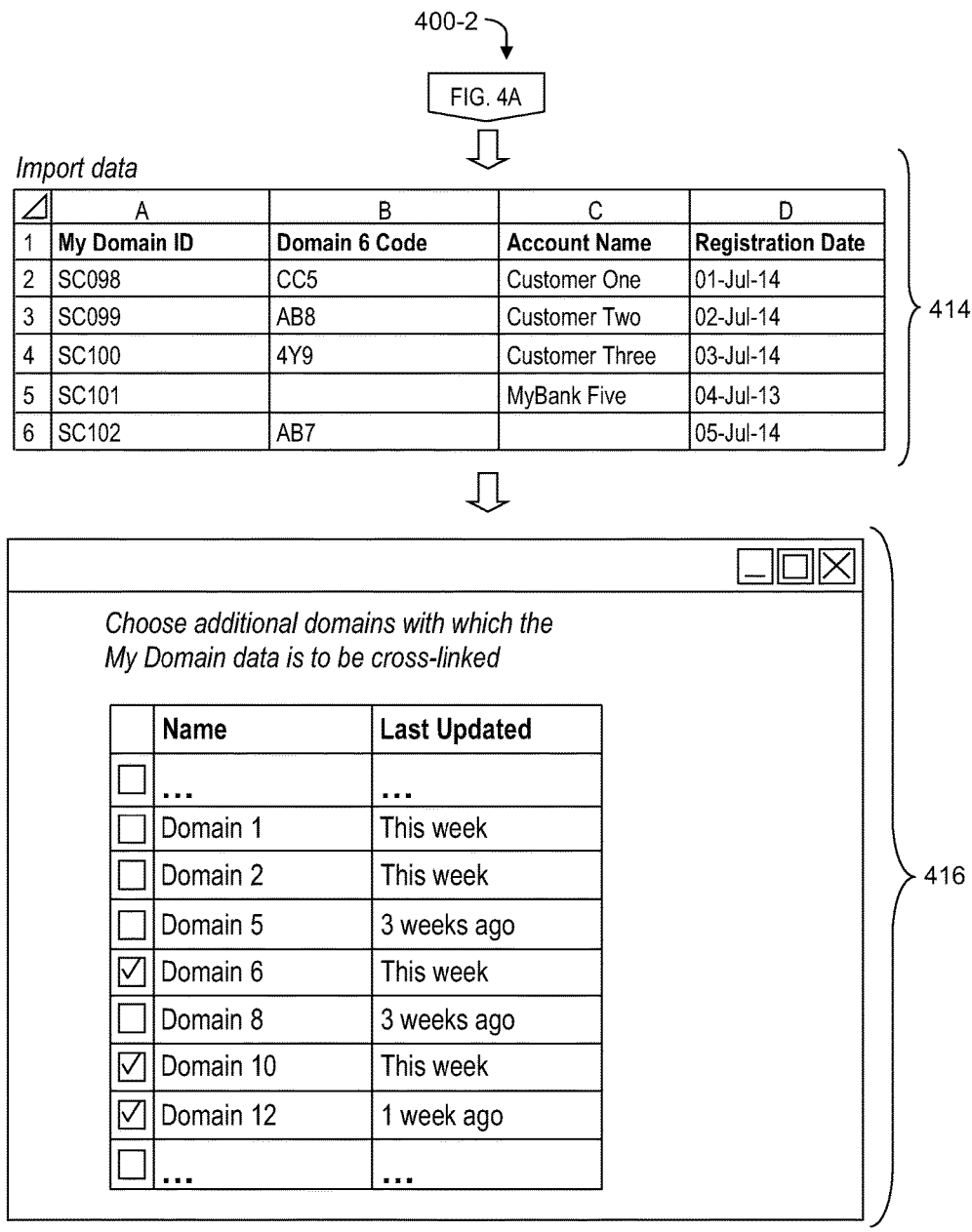

FIGS. 4A-4B depict an example of registering a data domain in a central hub in the process of FIG. 2, in accordance with embodiments of the present invention. A first portion 400-1 of the example of registering the data domain in the central hub in step 204 (see FIG. 2) includes data aggregation system 104 (see FIG. 1) receiving a user entry 402 of "My Domain," which is the name of the data domain being registered. Data aggregation system 104 (see FIG. 1) provides a user interface 404 which receives a user entry 406 of "Domain 6 Code," which is a name of an attribute being added to the data domain whose name is in entry 402. User interface 404 also receives a user selection of a Text data type in radio button selections 408 of data types, which include Number, Text, and Date and Time. User interface 404 further receives a user indication in a checkbox entry 410 that the attribute Domain 6 Code is an identifier, which means that the attribute Domain 6 Code is unique in the data domain My Domain. User interface 404 includes a table 412 of data domain names and times or time periods in which the data domains were last updated. In table 412, user interface 404 receives from a user an indication of one or more data domain(s) that are related to the attribute Domain 6 Code. Table 412 includes a user selection of Domain 6, which indicates that the attribute named Domain 6 Code is related to the data domain named Domain 6.

A second portion 400-2 of the example of registering the data domain in the central hub is shown in FIG. 4B. After receiving the user selection of Domain 6 in table 412 (see FIG. 4A), data aggregation system 104 (see FIG. 1) imports data to a table 414, including identifiers of datasets included in the data domain My Domain, values of the attribute Domain 6 Code, account names, and registration dates (i.e., dates on which respective datasets were registered in the central hub). The importing of data to table 414 is included in step 206 (see FIG. 2).

After importing the data to table 414, data aggregation system 104 (see FIG. 1) receives user selections of domains to which the data in My Domain is to be cross-linked. A user interface 416 includes checkboxes indicating user selections of Domain 6, Domain 10 and Domain 12 as the domains to which the data domain My Domain is to be cross-linked. The receipt of the user selections of the additional domains Domain 6, Domain 10, and Domain 12 is included in step 210 (see FIG. 2). In response to the user selections in interface 416, data aggregation system 104 (see FIG. 1) generates the cross-links from My Domain to Domain 6, Domain 10 and Domain 12 in step 212 (see FIG. 2).

Figure 5A:
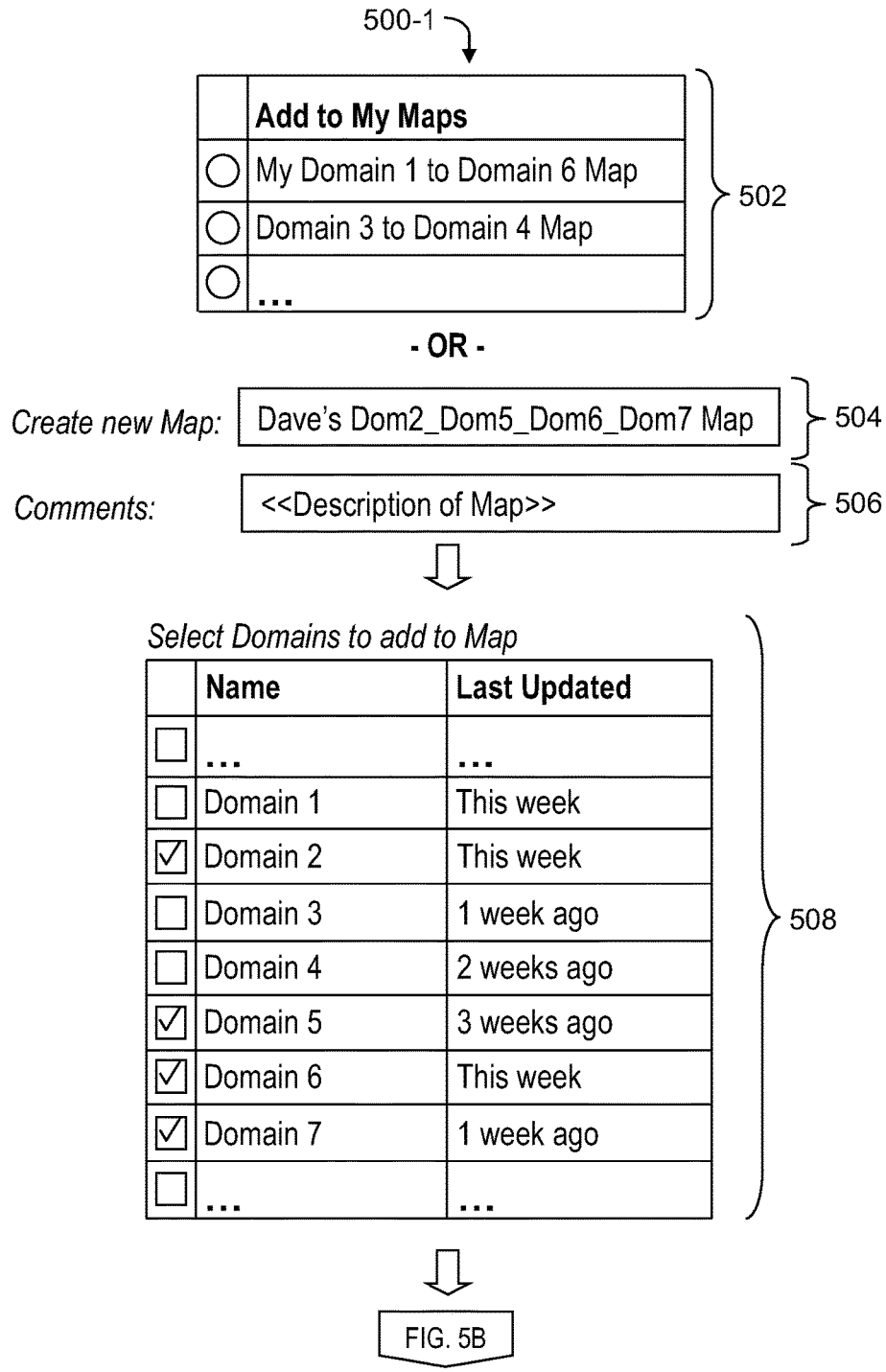
FIGS. 5A-5B depict an example of defining a new map and selecting data domains to add to the new map in the process of FIG. 3, in accordance with embodiments of the present invention.
Figure 5B:
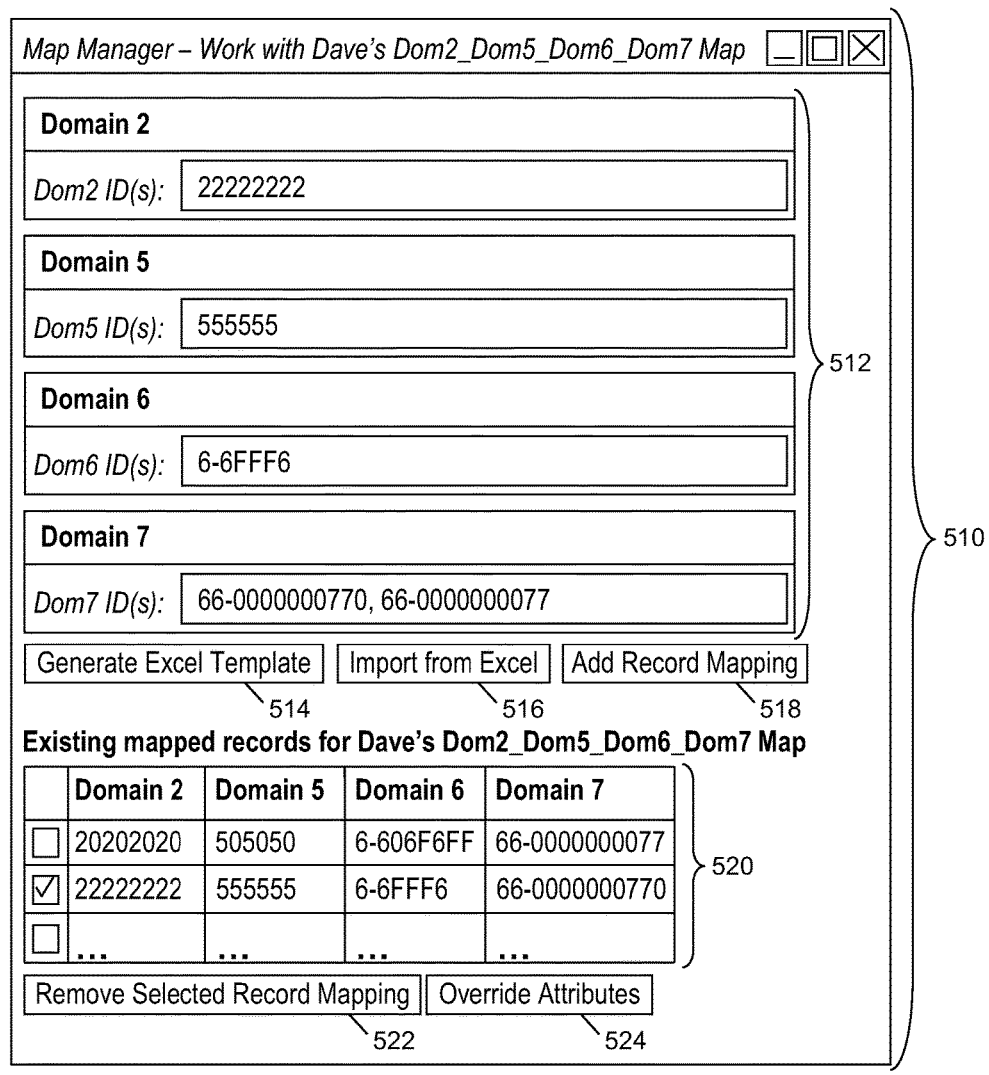

FIGS. 5A-5B depict an example of defining a new map and selecting data domains to add to the new map in the process of FIG. 3, in accordance with embodiments of the present invention. A first portion 500-1 of the example of defining the new map and selecting data domains to add to the new map includes data aggregation system 104 (see FIG. 1) (1) displaying potential selections 502 of predetermined maps to be added as mappings between data domains (e.g., My Domain 1 to Domain 6 Map and Domain 3 to Domain 4 Map included in selections 502) and/or (2) displaying an entry field 504 to receive a user entry of the new map to be added and a comments field 506 in which a user enters a description of the new map to be added. In the example shown in FIG. 5A, a user enters the map Dave's Dom2_Dom5_Dom6_Dom7 Map in entry field 504 to indicate the new map to be added.

After entering the new map to be added, data aggregation system 104 (see FIG. 1) displays an interface 508 which receives user entries in checkboxes to indicate selections of domains to add to the new map. In the example shown in FIG. 5A, interface 508 receives user selections of Domain 2, Domain 5, Domain 6, and Domain 7 as the domains to be added to the new map which was entered in field 504.

After receiving the user selections of the domains to add to the new map, data aggregation system 104 (see FIG. 1) displays a map manager interface 510 in FIG. 5B which allows a user to work with the new map named Dave's Dom2_Dom5_Dom6_Dom7 Map. Map manager interface 510 includes data domain identifier fields 512 which correspond to the domains selected in interface 508 (see FIG. 5A), a first graphical user interface (GUI) button 514 to generate a spreadsheet template for the new map, a second GUI button 516 to import data from a spreadsheet for the new map, and a third GUI button 518 to add record mapping for the new map. After selecting buttons 516 and 518, map manager interface 510 displays existing mapped records 520 for the new map named Dave's Dom2_Dom5_Dom6_Dom7 Map. Existing mapped records 520 includes checkboxes which indicate user selection(s) for activating a fourth GUI button 522 to remove with the selected record mapping or a fifth GUI button 524 to override attributes. Although not shown in FIG. 5B, map manager interface 510 also includes a selection to indicate whether to override the default map.

FIG. 6 depicts an example of overriding values of attributes in the process of FIG. 3, in accordance with embodiments of the present invention. Data aggregation system 104 (see FIG. 1) generates and displays an interface 600, which receives user entries to override rules for record mapping. Interface 600 includes tables 602 and 604, which include attributes and the attributes' corresponding values for the data domains Domain 2 and Domain 4, respectively. A user selection in the "Override?" column in table 602 indicates that the value of "Financial" for the attribute "Sector" in Domain 2 is being overridden to the new value of "Public" by the user entry of "Public" in the "Override to" column of table 602. A user selection in the "Override?" column in table 604 indicates that the value of "Financial" for the attribute "Sector" in Domain 4 is being overridden to the value "Public" which was entered by the user. The user activates the GUI button 606 to save the user entries of the new values of "Public" in table 602 and table 604.

Computer System

Figure 7:
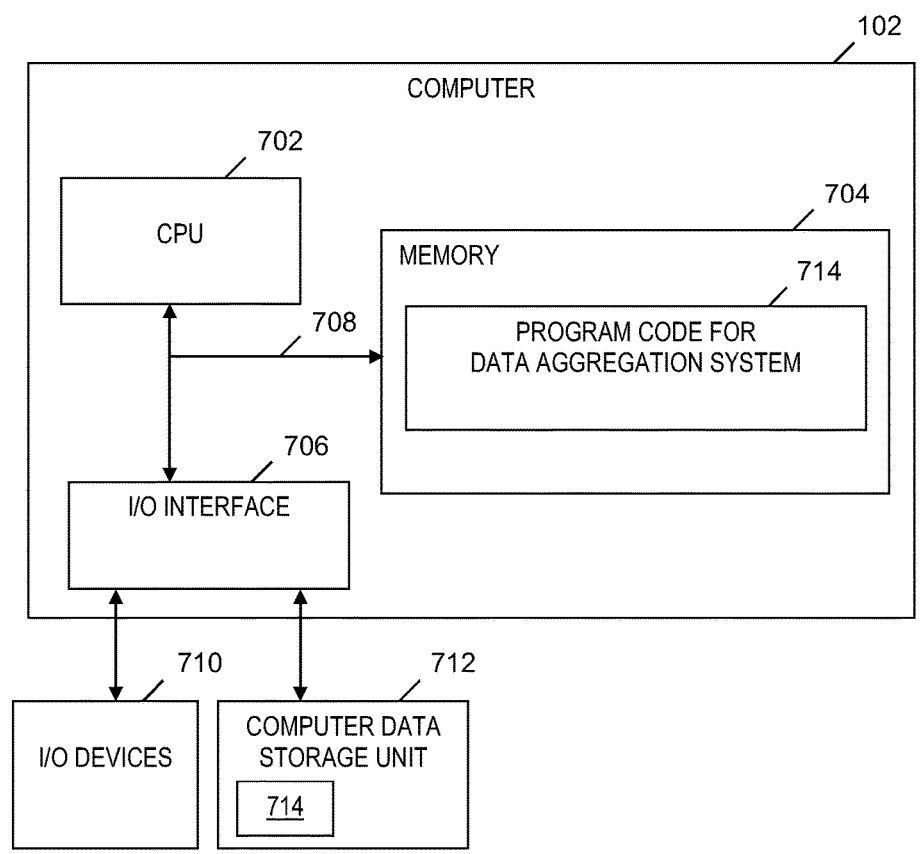
FIG. 7 is a block diagram of a computer that is included in the system of FIG. 1 and that implements the processes of FIG. 2 and FIG. 3, in accordance with embodiments of the present invention.

FIG. 7 is a block diagram of a computer that is included in the system of FIG. 1 and that implements the processes of FIG. 2 and FIG. 3, in accordance with embodiments of the present invention. Computer 102 is a computer system or mobile computing device that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including carrying out instructions included in program code 714 to perform a method of aggregating business data, where the instructions are carried out by CPU 702 via memory 704. CPU 702 may include a single processing unit, or be distributed across one or more processing units in one or more locations (e.g., on a client and server). Program code 714 includes program code for data aggregation system 104 (see FIG. 1).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display device, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are carried out by CPU 702 via memory 704 to aggregate business data. Although FIG. 7 depicts memory 704 as including program code 714, the present invention contemplates embodiments in which memory 704 does not include all of code 714 simultaneously, but instead at one time includes only a portion of code 714. Further, memory 704 includes an operating system (not shown) and may include other systems not shown in FIG. 7.

Storage unit 712 and/or one or more other computer data storage units (not shown) that are coupled to computer 102 may include dataset registration information 108 (see FIG. 1), cross-links 110 (see FIG. 1), dataset visibility attributes 112 (see FIG. 1), user-modified datasets (see FIG. 1), and user-modified cross-links (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to aggregating business data. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to aggregate business data. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of aggregating business data.

While it is understood that program code 714 for aggregating business data may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of aggregating business data. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method of aggregating business data, the method comprising the steps of:
   a computer receiving, from a user, columns, attributes of the columns, and keys of a dataset of a database, the keys being unique identifiers of records in the dataset, and the dataset not being initially cross-linked to any dataset included in a central hub of a plurality of datasets, each dataset including data that is independently and locally maintained;
   based on the received columns, attributes, and keys of the dataset, the computer registering the dataset so that the dataset is included in the central hub;
   the computer loading initial data or updated data into the dataset in the central hub;
   the computer determining and displaying other datasets included in the central hub that include columns, attributes, or keys that match the received columns, attributes, or keys, respectively;
   the computer receiving from the user a selection of one or more of the displayed datasets;
   in response to the step of receiving the selection, the computer automatically generating cross-links between the dataset and each of the one or more datasets selected from the displayed datasets, the cross-links based at least in part on the columns, attributes, or keys of the displayed datasets that match the received col- umns, attributes or keys, and the cross-links providing an aggregation of business data in the dataset and the one or more datasets;

the computer displaying the cross-links between the dataset and each of the one or more datasets, and in response, receiving from the user or another user a selection of one of the displayed cross-links;

the computer receiving from the user or the other user a modification of the cross-link whose selection was received;

the computer storing the modification of the cross-link in association with the cross-link;

based on the modification of the cross-link being stored in association with the cross-link and in response to an interaction with the central hub by a second user, the computer displaying (1) the modification of the cross-link instead of the cross-link and (2) cross-link(s) other than the cross-link whose selection was received as a potential selection by the second user, the second user being different from the user;

the computer receiving from the second user a selection of the displayed modification of the cross-link or one of the other cross-link(s); and based on the selection received from the second user, the computer performing an analysis of data in the dataset.

2. The method of claim 1, further comprising the step of the computer receiving a selection of visibility of the dataset, which indicates that the dataset has (1) public visibility to all users of the central hub or (2) private visibility to a predetermined group of users that is a proper subset of all users of the central hub.

3. The method of claim 2, further comprising the steps of:
the computer determining the selected visibility of the dataset indicates the dataset has private visibility;
the computer determining the other user is attempting to access the dataset via the central hub;
the computer determining the other user is included in the predetermined group of users;
based on the other user being included in the predetermined group of users, the computer providing the other user with access to the dataset and to the cross-links between the dataset and each of the one or more datasets selected from the displayed datasets; and
responsive to a request by the other user, the computer generating an analysis of data in the dataset by utilizing the access of the other user to the dataset and to the cross-links.

4. The method of claim 1, further comprising the step of the computer receiving from the user a selection of foreign key(s) of the one or more datasets selected from the displayed datasets, wherein the step of automatically generating the cross-links is based in part on the received selection of the foreign key(s).

5. The method of claim 1, wherein the step of the computer receiving the modification of the cross-link includes receiving an additional record or a pruned record to modify the cross-link.

6. The method of claim 1, further comprising:
providing at least one support service for at least one of creating, integrating, hosting, maintaining, and deploying computer-readable program code in the computer, the program code being executed by a processor of the computer to implement the steps of receiving the columns, attributes, and keys, registering the dataset, loading the initial or updated data, determining and displaying the other datasets, receiving the selection, generating the cross-links, displaying the cross-links, receiving the selection of one of the displayed cross-links, receiving the modification of the cross-link, storing the modification of the cross-link, displaying the modification of the cross-link and the cross-link(s) other than the cross-link whose selection was received as the potential selection by the second user, receiving the selection of the displayed modification of the cross-link, receiving the selection of the displayed modification of the cross-link or one of the other cross-link(s), and performing the analysis of the data in the dataset.

7. A computer program product, comprising:
a computer-readable storage device; and
a computer-readable program code stored in the computer-readable storage device, the computer-readable program code containing instructions that are executed by a central processing unit (CPU) of a computer system to implement a method of aggregating business data, the method comprising the steps of:
the computer system receiving from a user columns, attributes of the columns, and keys of a dataset of a database, the keys being unique identifiers of records in the dataset, and the dataset not being initially cross-linked to any dataset included in a central hub of a plurality of datasets, each dataset including data that is independently and locally maintained;
based on the received columns, attributes, and keys of the dataset, the computer system registering the dataset so that the dataset is included in the central hub;
the computer system loading initial data or updated data into the dataset in the central hub;
the computer system determining and displaying other datasets included in the central hub that include columns, attributes, or keys that match the received columns, attributes, or keys, respectively;
the computer system receiving from the user a selection of one or more of the displayed datasets;
in response to the step of receiving the selection, the computer system automatically generating cross-links between the dataset and each of the one or more datasets selected from the displayed datasets, the cross-links based at least in part on the columns, attributes, or keys of the displayed datasets that match the received columns, attributes or keys, and the cross-links providing an aggregation of business data in the dataset and the one or more datasets;
the computer system displaying the cross-links between the dataset and each of the one or more datasets, and in response, receiving from the user or another user a selection of one of the displayed cross-links;
the computer system receiving from the user or the other user a modification of the cross-link whose selection was received;
the computer system storing the modification of the cross-link in association with the cross-link;
based on the modification of the cross-link being stored in association with the cross-link and in response to an interaction with the central hub by a second user, the computer system displaying (1) the modification of the cross-link instead of the cross-link and (2) cross-link(s) other than the cross-link whose selection was received as a potential selection by the second user, the second user being different from the user;
the computer system receiving from the second user a selection of the displayed modification of the cross-link or one of the other cross-link(s); and based on the selection received from the second user, the computer system performing an analysis of data in the dataset.

8. The computer program product of claim 7, wherein the method further comprises the step of the computer system receiving a selection of visibility of the dataset, which indicates that the dataset has (1) public visibility to all users of the central hub or (2) private visibility to a predetermined group of users that is a proper subset of all users of the central hub.

9. The computer program product of claim 8, wherein the method further comprises the steps of:
the computer system determining the selected visibility of the dataset indicates the dataset has private visibility;
the computer system determining the other user is attempting to access the dataset via the central hub;
the computer system determining the other user is included in the predetermined group of users;
based on the other user being included in the predetermined group of users, the computer system providing the other user with access to the dataset and to the cross-links between the dataset and each of the one or more datasets selected from the displayed datasets; and
responsive to a request by the other user, the computer system generating an analysis of data in the dataset by utilizing the access of the other user to the dataset and to the cross-links.

10. The computer program product of claim 7, wherein the method further comprises the step of the computer system receiving from the user a selection of foreign key(s) of the one or more datasets selected from the displayed datasets, wherein the step of automatically generating the cross-links is based in part on the received selection of the foreign key(s).

11. The computer program product of claim 7, wherein the step of the computer system receiving the modification of the cross-link includes receiving an additional record or a pruned record to modify the cross-link.

12. A computer system comprising:
a central processing unit (CPU);
a memory coupled to the CPU; and
a computer-readable storage device coupled to the CPU, the storage device containing instructions that are executed by the CPU via the memory to implement a method of aggregating business data, the method comprising the steps of:
the computer system receiving from a user columns, attributes of the columns, and keys of a dataset of a database, the keys being unique identifiers of records in the dataset, and the dataset not being initially cross-linked to any dataset included in a central hub of a plurality of datasets, each dataset including data that is independently and locally maintained;
based on the received columns, attributes, and keys of the dataset, the computer system registering the dataset so that the dataset is included in the central hub;
the computer system loading initial data or updated data into the dataset in the central hub;
the computer system determining and displaying other datasets included in the central hub that include columns, attributes, or keys that match the received columns, attributes, or keys, respectively;
the computer system receiving from the user a selection of one or more of the displayed datasets;
in response to the step of receiving the selection, the computer system automatically generating cross-links between the dataset and each of the one or more datasets selected from the displayed datasets, the cross-links based at least in part on the columns, attributes, or keys of the displayed datasets that match the received columns, attributes or keys, and the cross-links providing an aggregation of business data in the dataset and the one or more datasets;
the computer system displaying the cross-links between the dataset and each of the one or more datasets, and in response, receiving from the user or another user a selection of one of the displayed cross-links;
the computer system receiving from the user or the other user a modification of the cross-link whose selection was received;
the computer system storing the modification of the cross-link in association with the cross-link;
based on the modification of the cross-link being stored in association with the cross-link and in response to an interaction with the central hub by a second user, the computer system displaying (1) the modification of the cross-link instead of the cross-link and (2) cross-link(s) other than the cross-link whose selection was received as a potential selection by the second user, the second user being different from the user;
the computer system receiving from the second user a selection of the displayed modification of the cross-link or one of the other cross-link(s); and
based on the selection received from the second user, the computer system performing an analysis of data in the dataset.

13. The computer system of claim 12, wherein the method further comprises the step of the computer system receiving a selection of visibility of the dataset, which indicates that the dataset has (1) public visibility to all users of the central hub or (2) private visibility to a predetermined group of users that is a proper subset of all users of the central hub.

14. The computer system of claim 13, wherein the method further comprises the steps of:
the computer system determining the selected visibility of the dataset indicates the dataset has private visibility;
the computer system determining the other user is attempting to access the dataset via the central hub;
the computer system determining the other user is included in the predetermined group of users;
based on the other user being included in the predetermined group of users, the computer system providing the other user with access to the dataset and to the cross-links between the dataset and each of the one or more datasets selected from the displayed datasets; and
responsive to a request by the other user, the computer system generating an analysis of data in the dataset by utilizing the access of the other user to the dataset and to the cross-links.

15. The computer system of claim 12, wherein the method further comprises the step of the computer system receiving from the user a selection of foreign key(s) of the one or more datasets selected from the displayed datasets, wherein the step of automatically generating the cross-links is based in part on the received selection of the foreign key(s).

16. The computer system of claim 12, wherein the step of the computer system receiving the modification of the cross-link includes receiving an additional record or a pruned record to modify the cross-link.

* * * * *